(12) United States Patent
Schultz

(10) Patent No.: US 12,712,369 B2
(45) Date of Patent: Aug. 18, 2026

(54) CIRCUITRY TO PREVENT LITHIUM PLATING WITHIN A LITHIUM ION BATTERY

(71) Applicant: Spiers New Technologies, Inc., Nichols Hills, OK (US)

(72) Inventor: Bryan Schultz, Oklahoma City, OK (US)

(73) Assignee: Spiers New Technologies, Inc., Nichols Hills, OK (US)

( * ) Notice: Subject to any disclaimer, the term of this patent is extended or adjusted under 35 U.S.C. 154(b) by 0 days.

(21) Appl. No.: 18/659,902

(22) Filed: May 9, 2024

(65) Prior Publication Data

US 2024/0291310 A1 Aug. 29, 2024

Related U.S. Application Data

(60) Continuation of application No. 17/529,526, filed on Nov. 18, 2021, now Pat. No. 11,984,754, which is a (Continued)

(51) Int. Cl.
*H02J 7/14* (2006.01)
*H01M 10/0525* (2010.01)
(Continued)

(52) U.S. Cl.
CPC ....... *H02J 7/1446* (2013.01); *H01M 10/0525* (2013.01); *H01M 10/486* (2013.01);
(Continued)

(58) Field of Classification Search
CPC .. H02J 7/0091; H02J 7/007192; H02J 7/0026; H02J 7/008; H01M 10/0525; H01M 2200/00
(Continued)

(56) References Cited

U.S. PATENT DOCUMENTS 3,917,990 A 11/1975 Sherman, Jr.
3,947,744 A * 3/1976 Grace ....................... H02J 7/14 320/DIG. 34

(Continued)

FOREIGN PATENT DOCUMENTS

CN 105359332 A * 2/2016 .......... H01M 50/574
DE 102015210036 A1 * 12/2016 .......... H01M 50/517

(Continued)

OTHER PUBLICATIONS

Kayaba, English Translation of JP 2014157778A, 2011 (Year: 2011).*

(Continued)

*Primary Examiner* — Suresh Memula

(74) *Attorney, Agent, or Firm* — DUNLAP CODDING, P.C.

(57) ABSTRACT

A lithium battery pack is described. The lithium battery pack includes a lithium battery having a plurality of battery units connected together in a series configuration, and an environmental management circuit in parallel with the plurality of battery units of the lithium battery. The environmental management circuit has a load distributed through the lithium battery, and circuitry operable to block energy directed to the lithium battery when a temperature of the lithium battery is below a predetermined threshold; and direct the energy to the load distributed through the lithium battery to warm the lithium battery.

18 Claims, 4 Drawing Sheets

Related U.S. Application Data division of application No. 16/390,834, filed on Apr. 22, 2019, now Pat. No. 11,211,814.

(60) Provisional application No. 62/661,370, filed on Apr. 23, 2018.

(51) Int. Cl.
*H01M 10/48* (2006.01)
*H02J 7/90* (2026.01)
*H02J 105/37* (2026.01)

(52) U.S. Cl.
CPC .............. *H02J 7/933* (2026.01); *H02J 7/977* (2026.01); *H01M 2200/00* (2013.01); *H02J 2105/37* (2026.01)

(58) Field of Classification Search
USPC .......................................................... 320/150
See application file for complete search history.

(56) References Cited

U.S. PATENT DOCUMENTS 4,006,397 A 2/1977 Catotti
4,670,703 A 6/1987 Williams
5,410,238 A 4/1995 Ishizuka
5,875,085 A 2/1999 Farley
5,908,453 A * 6/1999 Tabata ...................... B60L 7/16 320/132
6,331,365 B1 * 12/2001 King ....................... B60L 50/51 320/126
6,608,470 B1 8/2003 Oglesbee et al.
6,936,994 B1 * 8/2005 Gimlan ................... B60L 8/006 320/101
7,420,295 B2 * 9/2008 Omae ..................... H02J 9/061 320/101
7,446,508 B2 11/2008 Aradachi et al.
8,269,460 B2 * 9/2012 Ishikawa ................ G01R 31/54 320/122
8,305,018 B2 * 11/2012 Okamura ................ B60L 53/00 320/133
8,306,692 B2 * 11/2012 Ishishita ............. H01M 10/486 318/140
8,350,533 B2 1/2013 Tam et al.
8,360,184 B2 * 1/2013 Kydd ...................... B60L 58/12 180/65.265
8,552,693 B2 10/2013 Paryani
8,565,953 B2 * 10/2013 Kato ...................... B60K 6/365 701/63
8,571,733 B2 * 10/2013 Yamamoto .............. B60L 50/16 320/104
8,981,589 B2 * 3/2015 Lienkamp ................. G05F 5/00 323/272
9,859,738 B2 * 1/2018 Katayama ........... H02J 7/00712
10,017,039 B1 * 7/2018 Colavincenzo ....... B60W 10/06
2002/0113577 A1 * 8/2002 Purdy ................... H02M 7/797 320/137
2006/0022646 A1 2/2006 Moore et al.
2007/0120530 A1 * 5/2007 Nozaki ............... H02J 7/00308 320/130
2007/0210742 A1 * 9/2007 Brecht .............. H02J 7/007194 320/104
2008/0024079 A1 * 1/2008 Matsubara .............. H02P 27/08 320/166
2009/0039827 A1 * 2/2009 Fowler ...................... H02J 7/35 320/101
2009/0085516 A1 * 4/2009 Emori ..................... B60L 58/15 340/455
2009/0130542 A1 * 5/2009 Mizoguchi ............ H02J 7/0016 429/61
2011/0001442 A1 * 1/2011 Lee ....................... H02J 7/1423 320/117
2011/0012562 A1 * 1/2011 Paryani ............ H02J 7/007192 320/152
2011/0209949 A1 * 9/2011 McCabe ................ H02J 7/345 187/222
2011/0260544 A1 * 10/2011 Imai ...................... H02J 7/1423 307/66
2012/0007551 A1 * 1/2012 Song ....................... B60L 53/24 320/109
2013/0200848 A1 * 8/2013 Ozawa .................... B60L 58/19 320/112
2013/0293192 A1 * 11/2013 Abe ........................ H02J 50/12 320/108
2016/0001667 A1 * 1/2016 Masuda .................. B60L 50/16 180/65.225
2016/0059733 A1 * 3/2016 Hettrich .................. B60L 58/27 701/2
2017/0001535 A1 * 1/2017 Dulle .................... B60L 15/007
2017/0250543 A1 * 8/2017 Kanada ............... H01M 10/443
2017/0354087 A1 * 12/2017 Yamagishi ............ H01M 10/44
2018/0264956 A1 * 9/2018 Takagi .................. H02J 7/0068
2019/0025376 A1 * 1/2019 Saha ................... H01M 10/054

FOREIGN PATENT DOCUMENTS

JP 2014157778 A * 8/2014
WO WO1996017397 6/1996
WO WO-2019188056 A1 * 10/2019 ............ H01M 10/12

OTHER PUBLICATIONS

Bandhauer, Todd, A Critical Review of Thermal Issues in Lithium-Ion Batteries, Journal of the Electrochemical Society 2011 vol. 158, issue 3, R1-R25. http://jes.ecsdl.org/content/158/3/R1.full.

Japan Patent Office, JP 2014-157778A, (English machine translation from JPO J-Platpat).

* cited by examiner

CIRCUITRY TO PREVENT LITHIUM PLATING WITHIN A LITHIUM ION BATTERY

INCORPORATION BY REFERENCE

The present patent application is a continuation patent application of U.S. Ser. No. 17/529,526, filed on Nov. 18, 2021, which is a divisional patent application of U.S. Ser. No. 16/390,834, filed on Apr. 22, 2019, which claims priority to and incorporates by reference the patent application identified by U.S. Ser. No. 62/661,370, filed on Apr. 23, 2018, and titled "Circuitry To Prevent Lithium Plating Within a Lithium Ion Battery", the entire content of both applications is hereby incorporated herein by reference.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

BACKGROUND OF THE INVENTION

A rechargeable battery, storage battery, secondary cell, or accumulator is a type of electrical battery which can be charged, discharged into a load, and recharged many times, while a non-rechargeable or primary battery is supplied fully charged, and discarded once discharged. Rechargeable batteries are composed of one or more electrochemical cells. The term "accumulator" is used as it accumulates and stores energy through a reversible electrochemical reaction. Rechargeable batteries are produced in many different shapes and sizes, ranging from button cells to megawatt systems connected to stabilize an electrical distribution network. Several different combinations of electrode materials and electrolytes are used, including lead-acid, nickel cadmium (NiCd), nickel metal hydride (NiMH), lithium ion (Li-ion), and lithium ion polymer (Li-ion polymer).

Rechargeable batteries are used for many applications including powering automobiles, portable consumer devices, light vehicles (such as motorized wheelchairs, golf carts, electric bicycles, and electric forklifts), tools, and uninterruptible power supplies. Emerging applications in hybrid internal combustion-battery and electric vehicles are driving the technology to reduce cost, weight, size, and increase lifetime. Grid energy storage applications use rechargeable batteries for load-leveling, storing electric energy at times of low demand for use during peak periods, and for renewable energy uses, such as storing power generated from photovoltaic arrays during the day to be used at night. Load-leveling reduces the maximum power which a plant must be able to generate, reducing capital cost and the need for peaking power plants.

Rechargeable batteries include a positive active material, a negative active material and in some cases an electrolyte. The positive active material and the negative active material are disposed in the electrolyte. During charging, the positive active material is oxidized, producing electrons, and the negative material is reduced, consuming electrons. These electrons constitute a current flow in a circuit external to the rechargeable battery. The electrolyte may serve as a buffer for internal ion flow between the electrodes, as in lithium-ion and nickel-cadmium cells, or the electrolyte may be an active participant in the electrochemical reaction, as in lead-acid cells.

The energy used to charge rechargeable batteries usually comes from a battery charger using AC mains electricity, or an alternator driven by a separate motive source such as an engine. Regardless of the source of energy, to store energy in a rechargeable battery, the rechargeable battery has to be connected to a DC voltage source. This is accomplished by connecting a negative terminal of the rechargeable battery to a negative terminal of a power source and a positive terminal of the power source to a positive terminal of the rechargeable battery. Further, a voltage output of the power source must be higher than that of the rechargeable battery, but not much higher: the greater the difference between the voltage of the power source and the battery's voltage capacity, the faster the charging process, but also the greater the risk of overcharging and damaging the rechargeable battery.

Battery charging and discharging rates are often discussed by referencing a "C" rate of current. The C rate is that which would theoretically fully charge or discharge the battery in one hour. For example, trickle charging might be performed at C/20 (or a "20 hour" rate), while typical charging and discharging may occur at C/2 (two hours for full capacity).

In some cases, rechargeable battery packs are formed of multiple electrochemical cells (hereinafter "cells") that are connected together in a series or parallel configuration. The capacity within cells of the various rechargeable battery packs vary depending on the discharge rate. Some energy is lost in the internal resistance of cell components (plates, electrolyte, interconnections), and the rate of discharge is limited by the speed at which chemicals in the cell can move about. For lead-acid cells, the relationship between time and discharge rate is described by Peukert's law; a lead-acid cell that can no longer sustain a usable terminal voltage at a high current may still have usable capacity, if discharged at a much lower rate. Data sheets for rechargeable cells often list the discharge capacity on 8-hour or 20-hour or other stated time; cells for uninterruptible power supply systems may be rated at 15 minute discharge.

Battery manufacturers' technical notes often refer to voltage per cell (VPC) for the individual cells that make up the battery. For example, to charge a 12 V lead-acid battery (containing 6 cells of 2 V each) at 2.3 VPC requires a voltage of 13.8 V across the battery's terminals.

Lithium plating is the formation of metallic lithium around the anode of lithium-ion batteries during charging. Plating, also called deposition, can cause lithium ion batteries to malfunction over time. One cause of lithium plating is charging a lithium ion battery in temperatures below 15 degrees C.

Lead acid batteries are tolerant of charging below 15 degrees C. Lead acid batteries have been used to power forklifts. When the fork is being raised, power is supplied to electric motors by a lead acid battery pack mounted within the forklift. When the fork is being lowered, an alternator generates electrical power, that is then directed to the lead acid battery pack to charge the battery pack. Recharging the battery pack upon lowering of the fork, extends the time between recharging the battery pack.

It would be advantageous to be able to power a work machine having battery charging circuitry designed for use with a lead acid battery pack with a replacement battery pack constructed of lithium ion batteries. Due to the characteristics of the lithium ion batteries, this would greatly extend the time between charging the battery pack. It is to such an improved work machine that the present disclosure is directed.

BRIEF DESCRIPTION OF THE DRAWINGS

To assist those of ordinary skill in the relevant art in making and using the subject matter hereof, reference is made to the appended drawings, which are not intended to be drawn to scale, and in which like reference numerals are intended to refer to similar elements for consistency. For purposes of clarity, not every component may be labeled in every drawing.

DETAILED DESCRIPTION OF EXEMPLARY EMBODIMENTS

Figure 1:
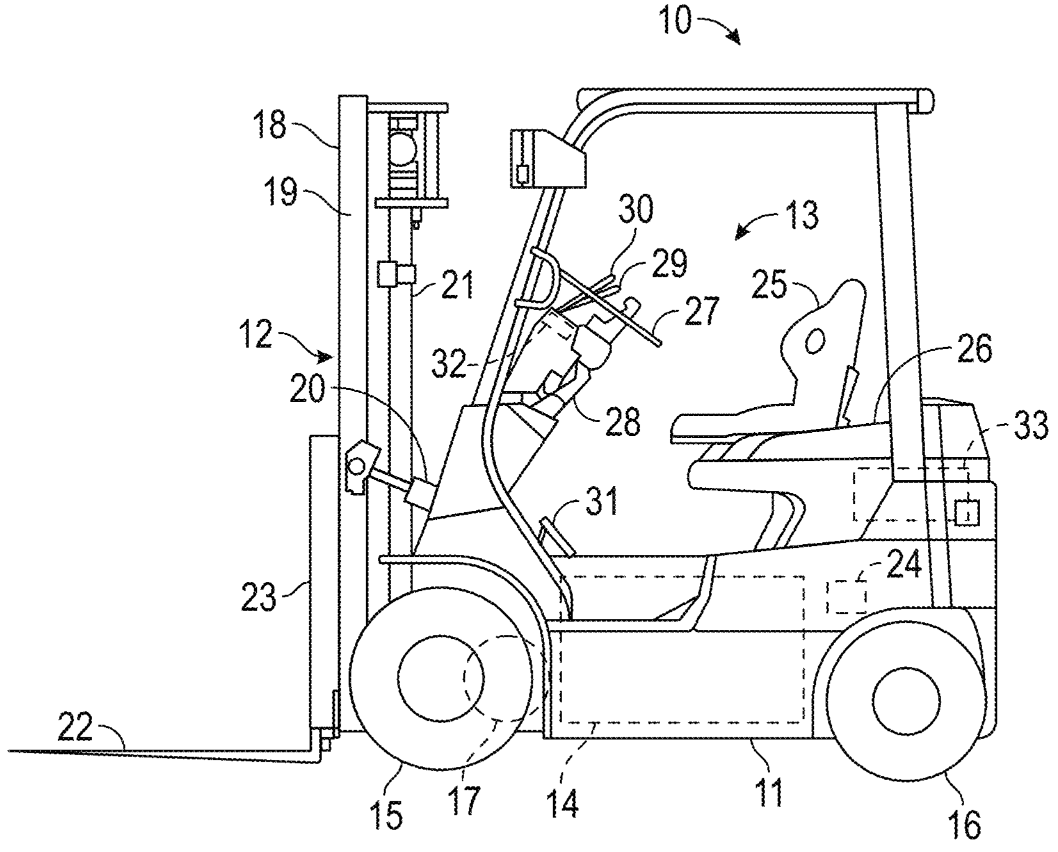
FIG. 1 is a block diagram of an exemplary hardware configuration of part of a work machine in accordance with an embodiment of the present disclosure.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. The inventive concepts disclosed herein are capable of other embodiments, or of being practiced or carried out in various ways. Also, it is to be understood that the phraseology and terminology employed herein is for the purpose of description and should not be regarded as limiting the inventive concepts disclosed and claimed herein in any way.

In the following detailed description of embodiments of the inventive concepts, numerous specific details are set forth in order to provide a more thorough understanding of the inventive concepts. However, it will be apparent to one of ordinary skill in the art that the inventive concepts within the instant disclosure may be practiced without these specific details. In other instances, well-known features have not been described in detail to avoid unnecessarily complicating the instant disclosure.

As used herein, the terms "comprises," "comprising," "includes," "including," "has," "having," and any variations thereof, are intended to cover a non-exclusive inclusion. For example, a process, method, article, or apparatus that comprises a list of elements is not necessarily limited to only those elements, and may include other elements not expressly listed or inherently present therein.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B is true (or present).

In addition, use of the "a" or "an" are employed to describe elements and components of the embodiments disclosed herein. This is done merely for convenience and to give a general sense of the inventive concepts. This description should be read to include one or at least one and the singular also includes the plural unless it is obvious that it is meant otherwise.

As used herein, qualifiers like "substantially," "about," "approximately," and combinations and variations thereof, are intended to include not only the exact amount or value that they qualify, but also some slight deviations therefrom, which may be due to manufacturing tolerances, measurement error, wear and tear, stresses exerted on various parts, and combinations thereof, for example.

The term "battery unit" as used herein means an individual battery cell, or multiple battery cells permanently connected together to form a module.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Embodiments of the present invention will hereinafter be described in detail with reference to the drawings.

Referring now to the drawings, and in particular to FIG. 1, shown therein is a block diagram of an exemplary hardware configuration of part of an industrial machine, in the form of a forklift in accordance with an embodiment of the present disclosure. In some embodiments, the industrial machine is a conventional vehicle that is described and shown in block diagram form in U.S. Pat. No. 8,825,246. The following discussion of FIG. 1 was modeled on the description of the forklift truck in U.S. Pat. No. 8,825,246.

Figure 2:
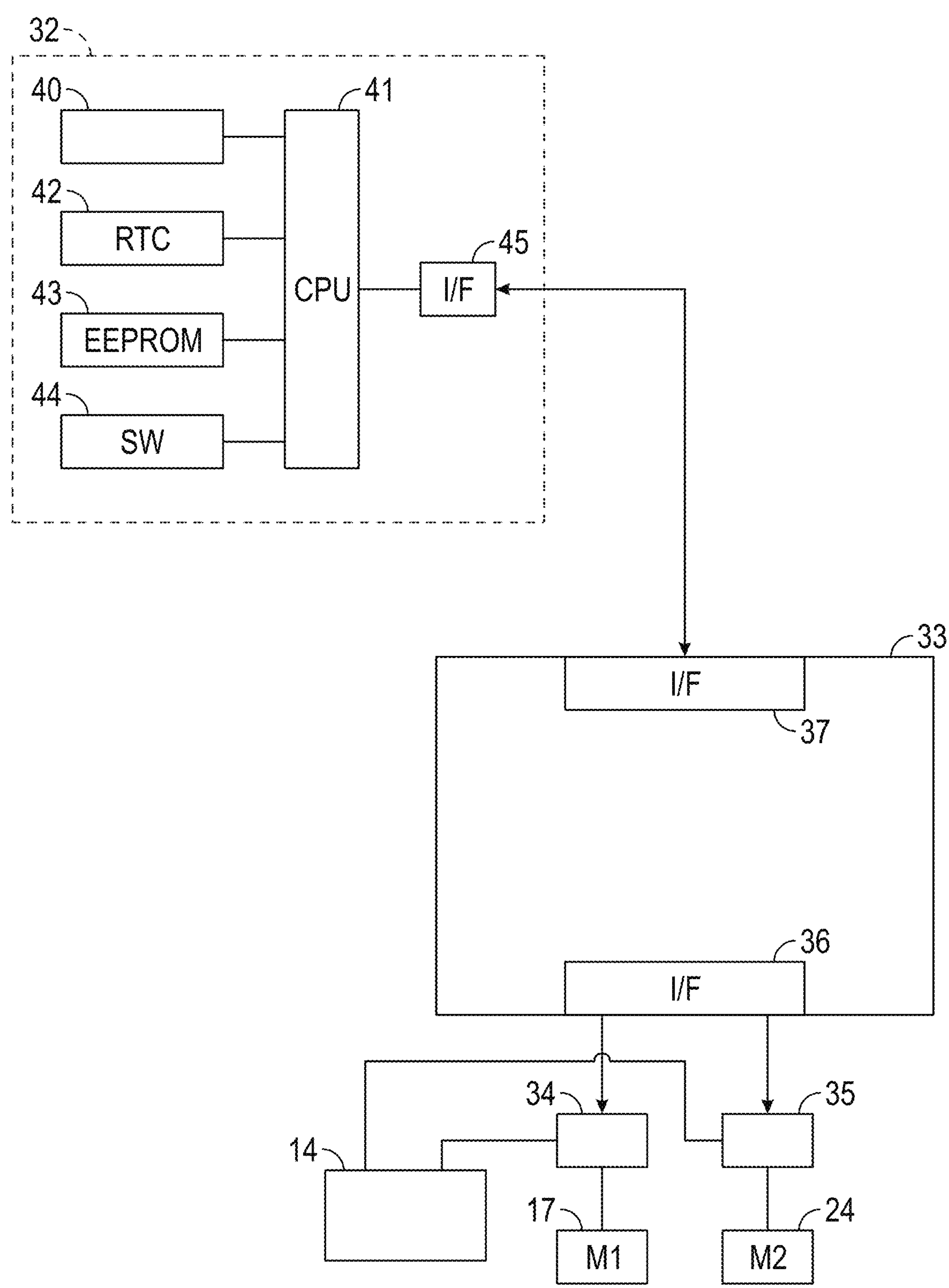
FIG. 2 is a block diagram of the electronics of a conventional lead-acid battery powered work machine.

The following will describe a forklift truck as an industrial machine according to a first preferred embodiment of the present disclosure with reference to FIGS. 1 and 2. In the following description, the terms such as "forward and backward", "left and right" and "upper and lower" designate directions as viewed by an operator of the forklift truck seated in the operator's compartment and facing forward of the forklift truck.

Referring to FIG. 1, reference numeral 10 designates a forklift truck as an industrial machine. The forklift truck 10 includes a truck body 11 serving as a vehicle body of the present disclosure and a load handling implement 12 mounted to the front of the truck body 11. An operator's compartment 13 is provided in the center of the truck body 11, and a battery 14 is accommodated in the truck body 11 under the operator's compartment 13. The battery 14 may be provided by a lead-acid battery having an electrolyte solution. Drive wheels 15 are arranged in front of the truck body 11 as front wheels, and steered wheels 16 are arranged in rear of the truck body 11 as rear wheels. A traction motor 17 is mounted in the truck body 11 for generating torque as an electric motor, as well as generating power for charging the battery 14 (known as regenerative braking) when the forklift truck 10 is slowing down. Power transmission mechanism (not shown) is disposed between the traction motor 17 and the drive wheels 15 for transmitting the torque to the drive wheels 15. The forklift truck 10 of the first preferred embodiment is a battery-powered forklift truck driven by electric power from the battery 14 mounted on the truck body 11.

The load handling implement 12 has a mast assembly 18 including paired outer masts 19 and inner masts (not shown). The pair of the left and right outer masts 19 has therebetween the paired inner masts that are slidable relative to the outer masts 19. Hydraulically-operated tilt cylinders 20 may be mounted to the outer masts 19, to permit the mast assembly 18 to be tiltable in the forward and backward directions of the forklift truck 10 by the operation of the tilt cylinders 20. Hydraulically-operated lift cylinders 21 may be mounted to the inner masts and the inner masts are slidably raised and lowered by the operation of the lift cylinders 21. A pair of left and right forks 22 are mounted to the mast assembly 18 through lift brackets 23 which are arranged so as to be raised and lowered relative to the inner masts. The truck body 11 is equipped with a loading pump (not shown) for supplying hydraulic oil to the lift cylinders 21 and the tilt cylinders 20 and a load handling motor 24 as an electric motor for driving the loading pump to lift the left and right forks 22, and as well as generating power for charging the battery 14 (known as regenerative braking) when the left and right forks 22 are being lowered.

An operator's seat 25 on which the operator of the forklift truck 10 can be seated is mounted on a seat stand 26 in the operator's compartment 13 of the truck body 11. A steering wheel 27 may be disposed in front of the operator's seat 25. A travel lever 28 is provided on the left side of the steering wheel 27 and operated to select forward or backward travel of the forklift truck 10. A lift lever 29 is provided on the right side of the steering wheel 27 and used for operating the lift cylinders 21, and a tilt lever 30 is also provided on the same right side of the steering wheel 27 for operating the tilt cylinders 20.

An accelerator pedal 31 may be provided on the floor of the operator's compartment 13 for adjusting traveling speed of the forklift truck 10. Operation of the traction motor 17 may be controlled so that the forklift truck 10 travels at a speed corresponding to the degree to which the accelerator pedal 31 is depressed by the operator. The truck body 11 may be equipped with a controller 33 for performing various controls of the forklift truck 10. A display unit 32 may be provided in front of the steering wheel 27 at such a position adjacent to the lift lever 29 and the tilt lever 30 that provides good visibility for the operator.

The following will describe the electrical control of the forklift truck 10 with reference to FIG. 2. The controller 33 is connected through an interface 36 in a communicable manner to a drive circuit 34 that controls the traction motor 17 and also to a drive circuit 35 that controls the load handling motor 24. The traction motor 17 and the load handling motor 24 are connected through the respective drive circuits 34, 35 to the battery 14 to receive power from the battery 14. The traction motor 17 is driven by the drive circuit 34 which is operable in response to commands from the controller 33, and the load handling motor 24 is also driven by the drive circuit 35 which is operable in response to commands from the controller 33. The drive circuits 34 and 35 also permit power generated by the traction motor 17 and the load handling motor 24 to be supplied to the battery 14 due to regenerative braking. The controller 33 serves as a motor controller of the present disclosure and has a central processing unit (CPU) (not shown) operable to perform various control operations in predetermined procedures and a memory for storing various data. A built-in memory (not shown) in the CPU of the controller 33 stores therein programs for a torque limiting condition for limiting the torque of the traction motor 17 gradually. The torque limiting condition for the traction motor 17 serves as an electric motor limiting condition of the present disclosure.

When equipped with the display unit 32, the controller 33 is connected through an interface 37 in a communicable manner to the display unit 32 provided in the operator's compartment 13. The display unit 32 has a display screen 40 displaying various information including time and serving as a display device of the present disclosure, a central processing unit (CPU) 41, a real time clock IC 42, a memory 43 and control switches 44. The CPU 41 is connected in a communicable manner to the controller 33 through an interface 45, and various controls are performed through the CPU 41 in predetermined procedures.

The display screen 40 displays battery information such as a capacity of the battery 14, warning messages such as a warning about parking brake, time-related information such as an accumulated time during which the forklift truck 10 is in key-on state, i.e. when a key is inserted in the forklift truck 10 and a selected traveling mode. The control switches 44 include switches for displaying information, traveling mode selection and setting of charging schedule. The traveling mode may be set in stages in accordance with the load levels during traveling and load handling.

The real time clock IC 42 may be connected to the CPU 41 which provides current time and outputs the time data to the CPU 41. The real time clock IC 42 may serve as a current time clock even when the forklift truck 10 is in key-off state where the key is removed from the forklift truck 10. Vehicle operating time according to one embodiment corresponds to the time elapsing while the forklift truck 10 is in key-on state and calculated by the CPU 41 based on the time data of the real time clock IC 42. Thus, the CPU 41 serves as a vehicle operating time calculator of the present disclosure.

The memory 43 is connected to the CPU 41 and serves as a data-storing device of the present disclosure. The memory 43 stores data indicative of the elapsed time and retains data even without being powered on. For the sake of convenience, the memory 43 is shown by a single memory in FIG. 2, but the memory 43 may be provided by plural memories. The memory 43 may be provided by a rewritable non-volatile memory such as Electrically Erasable Programmable Read-Only Memory (EEPROM), but it is not limited to the EEPROM. If the display unit 32 has a backup power system for constantly supplying power to the memory 43, the memory 43 may be provided by a volatile memory, such as Random Access Memory (RAM) and a flash memory.

In accordance with the present disclosure, it is desirable to replace the lead-acid battery 14 of the forklift truck 10 with a lithium-ion battery pack 60. Some of the advantages of the lithium-ion battery pack 60 over the lead-acid battery 14 is increased energy density resulting in longer operating life between charges, greater cycle life, constant power and energy relative to various amounts of charge, enhanced depth of discharge, enhanced efficiency, and faster charging cycles. But, industrial machinery, such as the forklift truck 10, are used in a wide-variety of temperatures, including temperatures below 15 degrees C. As discussed above, lithium-ion batteries can be destroyed by a phenomenon known as lithium plating when charged below 15 degrees C. If the lead acid battery 14 were replaced with the lithium-ion battery pack 60 and the forklift truck 10 was operated below 15 degrees C., the regenerative braking of the traction motor 17 and the load handling motor 24 would direct a charging current to the lithium-ion battery pack 60 thereby destroying the lithium-ion battery pack 60.

As will be discussed below, the lithium-ion battery pack 60 is designed to be used as a replacement for the lead-acid battery 14 without requiring significant changes to the remainder of the forklift truck 10, without disabling the regenerative braking functions of the traction motor 17 and the load handling motor 24, and without incurring the problems associated with lithium plating.

Figure 3:
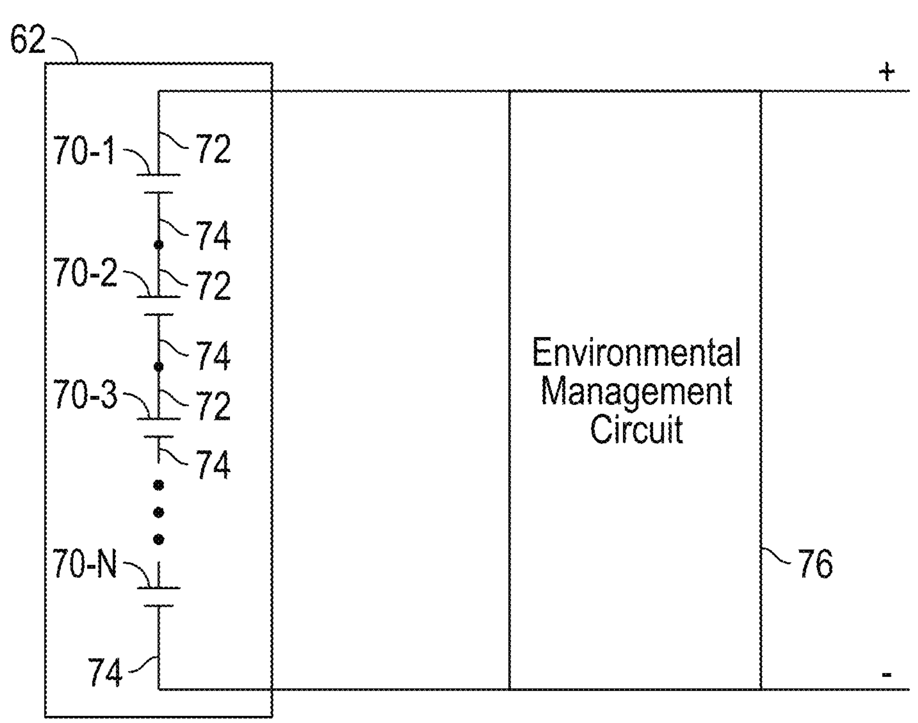
FIG. 3 is a block diagram of an exemplary battery pack, constructed in accordance with the present disclosure, and configured to replace the conventional lead-acid battery in the work machine depicted in FIGS. 1 and 2.
Figure 4:
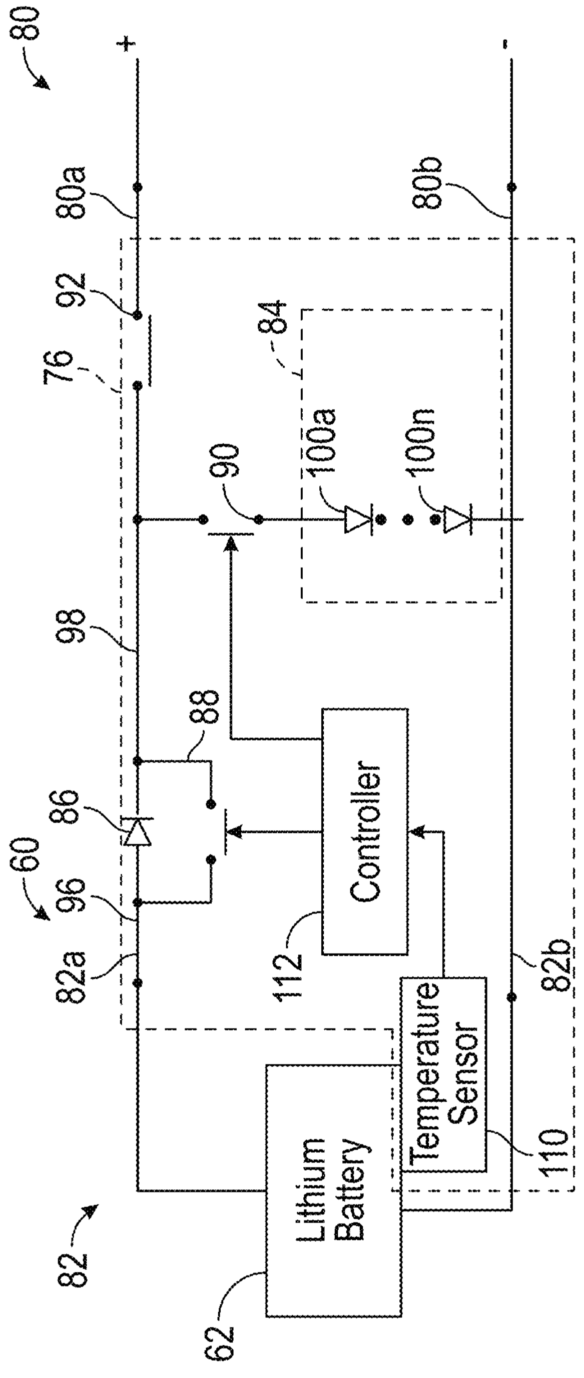
FIG. 4 is another block diagram of circuitry within the battery pack of FIG. 3, and configured to detect at least one environmental parameter and control regenerative braking power based upon a level of the at least one environmental parameter in accordance with the present disclosure.

As shown in FIG. 3, the battery pack 60 is provided with a lithium battery 62 having a plurality of battery units 70. By way of example, four battery units 70 are depicted in FIG. 4 and designated as 70-1, 70-2, 70-3 and 70-*n*. It should be understood that the battery pack 60 can have any number of battery units 70 and typically will have 28, 30, 38, 40, 48, or 96 battery units 70. In the example discussed herein, the battery pack 60 will have 96 battery units 70, connected in a 1P series configuration. The battery units 70 have a positive terminal 72 and a negative terminal 74. The battery units 70 can be combined in a series configuration in which the positive terminal 72 of one of the battery units 70 is connected to the negative terminal 74 of an adjacent battery unit 70.

The battery pack 60 is also provided with an environmental management circuit 76 configured to regulate regenerative braking power to the battery units 70 depending upon at least one environmental factor, such as temperature. The environmental management circuit 76 will be described hereinafter by way of example as monitoring temperature and regulating the regenerative braking power, but it should be understood that the environmental management circuit 76 can be configured to monitor any other environmental factor that will affect charging of the battery units 70.

In general, the environmental management circuit 76 is provided with source terminals 80, battery terminals 82, a load 84, a semiconductor device 86, a first environmental controlled switch 88, a second environmental controlled switch 90, and a main switch 92. The source terminals 80 are provided with a positive terminal 80*a*, and a negative terminal 80*b*. The battery terminals 82 include a first polarity terminal 82*a*, and a second polarity terminal 82*b*. The first polarity terminal 82*a* is in series with the semiconductor device 86. The semiconductor device 86 includes a first terminal 96 and a second terminal 98. Semiconductor device 86 is configured to only allow a flow of current in one direction, i.e. from the first terminal 96 to the second terminal 98. In one embodiment, the first terminal 96 is coupled to and in series with the first polarity terminal 82*a*. In some embodiments, the semiconductor device 86 is a diode or a transistor.

In some embodiments, the load 84 is coupled in series with the source terminals 80, and also coupled in parallel with a combination of the lithium battery 62 and the semiconductor device 86. The load 84 is adapted to mimic resistance, amperage and voltage properties of the lithium battery 62, as well as receive and dissipate any power generated due to regenerative braking. In one embodiment, the load 84 is implemented as a series of diodes 100*a-n* with each of the diodes 100*a-n* having a junction voltage, such as 0.7 V. The series of diodes 100*a-n* acts as a heat source when dissipating energy developed through regenerative braking. Further, the plurality of diodes 100*a-n* can be distributed through the lithium battery 62 for uniformly heating the lithium battery 62. For example, the diodes 100*a-n* can be mounted to bus bars within the lithium battery 62, so as to permit the transfer of heat through the bus bars and into battery units 70 of the lithium battery 62. The number of diodes can be selected so as to receive and dissipate the power generated due to regenerative braking without inducing excessive current. Excessive current, as referred to herein, refers to an amount of current which can damage any component within the battery pack 60, the drive circuits 34 and 35, the traction motor 17, or the load handling motor 24. In one embodiment, the following formula is used to determine the number of diodes 100*a-n* in the load 84.

No. of diodes=$V_b/V_j$, where $V_b$ is a voltage of the battery 62 when charged, and $V_j$ is a junction voltage of each of the junction voltages of the diodes 100*a-n*.

In other words, when the sum of the junction voltages of the diodes 100*a-n* equal the voltage of the battery 62, then power from regenerative braking can be directed to the diodes 100*a-n* and dissipated without inducing excessive current.

The formula set forth above presumes that all of the junction voltages are the same. This does not need to be the case, however, and diodes 100*a-n* having different, or a variety of junction voltages can be used. The load 84 can also be implemented as a series of transistors, or a circuit designed to mimic the resistance, current and voltage properties of the lithium battery 62.

The first environmentally controlled switch 88 is coupled in parallel with the semiconductor device 86. The second environmentally controlled switch 90 is coupled in series with the load 84. The first environmentally controlled switch 88 and the second environmentally controlled switch 90 are controllable, based upon an environmental parameter between open and closed positions. When the environmental parameter is in a first state, then the first environmentally controlled switch 88 and the second environmentally controlled switch 90 are in a first condition. In the first condition, the first environmentally controlled switch 88 is closed and the second environmentally controlled switch 90 is open. When the environmental parameter is in a second state, then the first environmentally controlled switch 88 and the second environmentally controlled switch 90 are in a second condition. In the second condition, the first environmentally controlled switch 88 is open and the second environmentally controlled switch 90 is closed.

For example, when the environmental parameter is temperature, a predetermined threshold can be used to delineate the first condition and the second condition. The predetermined threshold can be between 5-20 degrees Centigrade. For example, if the predetermined threshold is 15 degrees Centigrade, then temperatures 15 degrees Centigrade or above may be the first condition, and temperatures below 15 degrees Centigrade may be the second condition.

In the first condition, e.g., when the temperature of the battery 62 is sufficient to avoid damage due to lithium plating, the first environmentally controlled switch 88 is closed, and the second environmentally controlled switch 90 is open. This causes current coming to and/or from the lithium battery 62 to pass the semiconductor device 86 and to avoid the load 84. In the first condition, power can be supplied from the battery 62 to the traction motor 17 and the load handling motor 24, and power generated from regenerative braking is supplied to and recharges the lithium battery 62.

In the second condition, e.g., when the temperature of the lithium battery 62 is to low to permit recharging without damaging the lithium battery 62, the first environmentally controlled switch 88 is open, and the second environmentally controlled switch 90 is closed. This causes current supplied by the battery 62 to pass through the semiconductor device 86 and to avoid passing through the load 84 due to the sum of the junction voltages being equal to the battery voltage $V_b$. In the second condition, power can be supplied from the battery 62 to the traction motor 17 and the load handling motor 24. Power generated from regenerative braking that is directed to the battery 62, however, is blocked by the semiconductor device 86, and directed to the load 84 by the closure of the second temperature controlled switch 90. The load 84 dissipates the power generated from regenerative braking, by for example, converting the power into heat. When the load 84 dissipates the power generated from regenerative braking as heat, the load 84 can be thermally connected to the battery 62 so that the heat functions to warm the lithium battery 62.

As the temperature of the lithium battery 62 increases beyond the predetermined threshold, due at least in part to the heat supplied by the load 84 into the lithium battery 62, the first environmentally controlled switch 88 and the second environmentally controlled switch 90 are switched to the first condition to permit the regenerative power to recharge the battery 62 as discussed above.

The environmental management circuit 76 can also be provided with at least one environmental sensor 110 and a controller 112. The environmental sensor 110 is configured to sense an environmental parameter, such as temperature, and to supply an electrical signal to the controller 112 indicative of a level of the environmental parameter. For example, the environmental sensor 110 can be a thermocouple placed on or within the lithium battery 62 that generates an analog signal dependent upon the temperature of the lithium battery 62. The controller 112 receives and interprets the signal, and then provides control signals, e.g., simultaneously, to the first environmentally controlled switch 88 and the second environmentally controlled switch 90. In this regard, the controller 112 includes logic to interpret the information obtained from the environmental sensor 110 to determine whether the first environmentally controlled switch 88 and the second environmentally controlled switch 90 should be placed into the first condition or the second condition. In some embodiments, the controller 112 includes an analog to digital converter to convert analog signals generated by the environmental sensor into a digital format. The controller 112 can be implemented with circuitry. Circuitry, as used herein, may be analog and/or digital components, or one or more suitably programmed processors (e.g., microprocessors) and associated hardware and software, or hardwired logic. Also, “components” may perform one or more functions. The term “component,” may include hardware, such as a processor (e.g., microprocessor), and application specific integrated circuit (ASIC), field programmable gate array (FPGA), a combination of hardware and software, and/or the like. The term “processor” as used herein means a single processor or multiple processors working independently or together to collectively perform a task.

Software may include one or more computer readable instructions that when executed by one or more components cause the one or more component to perform a specified function. It should be understood that algorithms or process instructions described herein may be stored on one or more non-transitory computer readable medium. Exemplary non-transitory computer readable medium may include random access memory, read only memory, flash memory, and/or the like. Such non-transitory computer readable mediums may be electrically based, optically based, and/or the like.

In one embodiment, the present disclosure describes a method of upgrading a work machine, such as the forklift truck 10 having the lead-acid battery 14 coupled to a drive circuit 34 or 35 and at least one motor 17 or 24. In this embodiment, the lead-acid battery 14 is removed from the forklift truck 10, and the lithium-ion battery pack 60 having the lithium battery 62 and the environmental management circuit 76 is installed in the forklift truck 10 in circuit with the drive circuit 34 or 35 and the at least one motor 17 or 24.

From the above description, it is clear that the inventive concept(s) disclosed herein are well adapted to carry out the objects and to attain the advantages mentioned herein, as well as those inherent in the inventive concept(s) disclosed herein. While the embodiments of the inventive concept(s) disclosed herein have been described for purposes of this disclosure, it will be understood that numerous changes may be made and readily suggested to those skilled in the art which are accomplished within the scope and spirit of the inventive concept(s) disclosed herein.

What is claimed is:

1. A lithium battery pack, comprising:

a lithium battery having a plurality of battery units connected together in a series configuration; and an environmental management circuit in parallel with the plurality of battery units of the lithium battery, the environmental management circuit having a load distributed through the lithium battery, and circuitry operable to block energy directed to the lithium battery when a temperature of the lithium battery is below a predetermined threshold; and direct the energy to the load distributed through the lithium battery to warm the lithium battery.

2. The lithium battery pack of claim 1, wherein the environmental management circuit comprises:

a semiconductor device;

a first environmentally controlled switch coupled in parallel with the semiconductor device; and a second environmentally controlled switch coupled between a source terminal and the load, the first environmentally controlled switch and the second environmentally controlled switch being synchronized to switch between open and closed positions subject to temperature being in a first state or a second state, in the first state, the first environmentally controlled switch is closed and the second environmentally controlled switch is open.

3. The lithium battery pack of claim 2, wherein in the second state, the first environmentally controlled switch is open and the second environmentally controlled switch is closed.

4. The lithium battery pack of claim 2, wherein the environmental management circuit further comprises:

a temperature sensor; and a controller coupled to the temperature sensor and configured to receive data from the temperature sensor indicative of the temperature, and synchronously control the first environmentally controlled switch and the second environmentally controlled switch based upon the temperature sensed by the temperature sensor.

5. The lithium battery pack of claim 2, wherein the semiconductor device is configured to only allow a flow of current in one direction.

6. The lithium battery pack of claim 5, wherein the semiconductor device is a diode or a transistor.

7. The lithium battery pack of claim 1, wherein the load has a plurality of diodes coupled in series.

8. The lithium battery pack of claim 7, wherein the lithium battery has a battery voltage, and wherein the diodes have junction voltages, and wherein a sum of the junction voltage of the diodes is at least equal to the battery voltage.

9. The lithium battery pack of claim 1, wherein the predetermined threshold is in a range from 5-20 degrees Centigrade.

10. A lithium battery pack, comprising:

a lithium battery having a plurality of battery units connected together; and an environmental management circuit in parallel with the plurality of battery units of the lithium battery, the environmental management circuit having a load distributed through the lithium battery, and circuitry operable to block energy directed to the lithium battery when an environmental parameter of the lithium battery is below a predetermined threshold; and direct the energy to the load distributed through the lithium battery.

11. The lithium battery pack of claim 10, wherein the environmental management circuit comprises:

a semiconductor device;

a first environmentally controlled switch coupled in parallel with the semiconductor device; and a second environmentally controlled switch coupled between a source terminal and the load, the first environmentally controlled switch and the second environmentally controlled switch being synchronized to switch between open and closed positions subject to environmental parameter being in a first state or a second state, in the first state, the first environmentally controlled switch is closed and the second environmentally controlled switch is open.

12. The lithium battery pack of claim 11, wherein in the second state, the first environmentally controlled switch is open and the second environmentally controlled switch is closed.

13. The lithium battery pack of claim 11, wherein the environmental parameter is temperature, and wherein the environmental management circuit further comprises:

a temperature sensor; and a controller coupled to the temperature sensor and configured to receive data from the temperature sensor indicative of the temperature, and synchronously control the first environmentally controlled switch and the second environmentally controlled switch based upon the temperature sensed by the temperature sensor.

14. The lithium battery pack of claim 11, wherein the semiconductor device is configured to only allow a flow of current in one direction.

15. The lithium battery pack of claim 14, wherein the semiconductor device is a diode or a transistor.

16. The lithium battery pack of claim 10, wherein the load has a plurality of diodes coupled in series.

17. The lithium battery pack of claim 16, wherein the lithium battery has a battery voltage, and wherein the diodes have junction voltages, and wherein a sum of the junction voltage of the diodes is at least equal to the battery voltage.

18. The lithium battery pack of claim 10, wherein the environmental parameter is temperature, and wherein the predetermined threshold is in a range from 5-20 degrees Centigrade.

* * * * *